Sept. 15, 1970   A. L. SMITH   3,529,050
METHOD AND APPARATUS FOR PRODUCING A RESIN RICH SURFACE
Filed Feb. 6, 1967
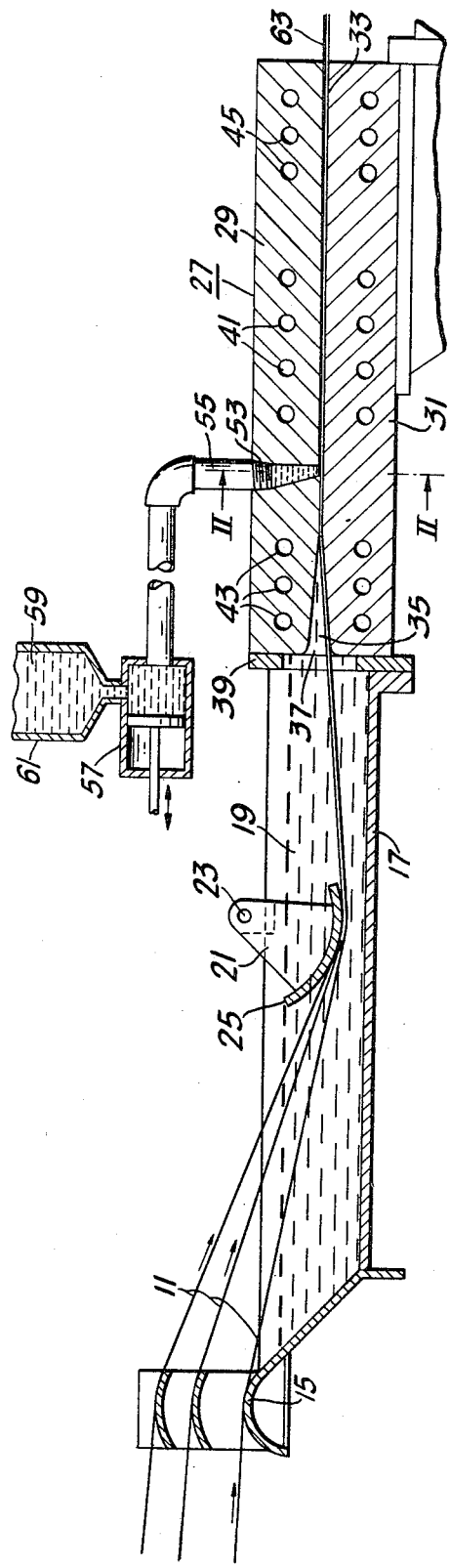
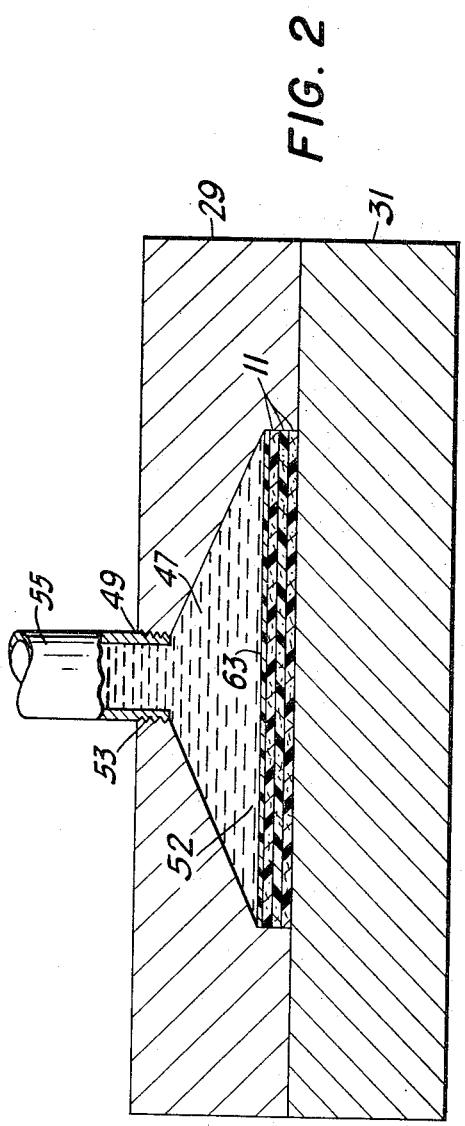
INVENTOR.
ARTHUR L. SMITH
BY Sherman H Barber
his Attorney

United States Patent Office 3,529,050
Patented Sept. 15, 1970

3,529,050
METHOD AND APPARATUS FOR PRODUCING A RESIN RICH SURFACE
Arthur L. Smith, Severna Park, Md., assignor, by mesne assignments, to Koppers Company, Inc., Pittsburgh, Pa., a corporation of Pennsylvania
Filed Feb. 6, 1967, Ser. No. 614,215
Int. Cl. B29g 5/00, 2/00
U.S. Cl. 264—137                                    4 Claims

ABSTRACT OF THE DISCLOSURE

There is disclosed herein a forming device or die having a passage through which resin impregnated filament reinforcements are drawn continually to shape and form an article of manufacture. A portion of the die is heated to accelerate curing of the resin that coats the filaments. Additional resin is introduced into the forming passage at a location just before the resin impregnated filaments pass through the heated portion, and the article emerging from the die has at least one resin rich surface.

BACKGROUND OF THE INVENTION

This invention relates to molding and molding devices and, more particularly, to an improved method and apparatus for producing resin rich surfaces on elongate articles composed of filament reinforced plastic materials.

DESCRIPTION OF THE PRIOR ART

Surface deficiencies and inadequacies have been deterrents to the adoption of many fiber glass reinforced plastic articles. Such surface defects are generally due to entrapped air or inadequate glass-to-resin bonds, particularly at the surface of a product. Some of the more common surface defects that are found in fiber glass reinforced plastic articles are: exposed fibers, fibers that have popped out of the surface, fibers in air pockets, large and small pinholes.

Heretofore it has been common practice to apply a "gel-coat" to the plastic article during the molding process or the "gel-coat" may be applied to the mold surface before fabrication of the article. However, when articles are formed from glass fiber mat, strip or rovings that is fed through a bath of heat-hardenable, thermosetting, liquid resin and through a forming passage or die structure, frequently, the article will not have the desired surface character and resort to gel-coating is required.

SUMMARY

In accordance with the invention heat hardenable thermosetting liquid resin preferably of high viscosity is injected into the forming passage of a die structure, through which resin impregnated filament reinforcements are drawn and wherein they are shaped as an article of manufacture, at a location in the forming passage intermediate the entrance of the passage and the heated portion thereof, whereby the formed elongate article emerging from the die has at least one resin-rich surface.

For a further understanding of the present invention and for advantages and features thereof, reference may be made to the following description in conjunction with the accompanying drawing which shows for the purpose of exemplification a preferred embodiment of the invention.

BRIEF DESCRIPTION OF THE DRAWING

FIG. 1 is a schematic longitudinal sectional view of a portion of apparatus for continuously forming filament reinforced plastic articles incorporating an embodiment of the invention; and FIG. 2 is a sectional view at an enlarged scale along line II—II of FIG. 1.

DESCRIPTION OF THE PREFERRED EMBODIMENT

Referring to FIG. 1, a plurality of fiber reinforcing strips 11, for instance three glass fiber mats, leading from suitable strip spools or reels (not shown) pass over the rounded end portion 15 of a resin pan 17 wherein there is a quantity of suitable liquid thermosetting resin 19. Situated within the resin pan 17 is a guide 21 that is adjustable pivotable about pin 23; guide 21 having a lower arcuate shoe 25 that guides the strips 11 into the resin 19 in such a manner that the strips 11 are fully submerged in the resin to insure impregnation of the srtips 11 with the resin.

A forming device or die structure 27 is joined to the resin pan 17, as shown in FIG. 1, and includes upper 29 and lower 31 die portions which are shaped to interfit and, in the embodiment illustrated, provide a rectangular shaped confining or forming passage 33 therebetween; the passage 33 having a desired cross sectional shape, as shown in FIG. 2. The forming passage 33 has a tapered entrance portion 35, as shown in FIG. 2, commencing at an enlarged inlet opening 37 at a common wall 39 between the resin pan 17 and the die portions 31, 33.

As the strips 11, advance through the resin 19 from the guide shoe 25, they pass through the inlet opening 37 and enter the tapered configuration of the entrance portion 35 that gradually compresses the strips 11 laterally until they enter the forming passage 33 where they are also compressed vertically. Thus, the strips 11 are compacted before they enter the forming passage 33 and excess resin 19 is squeezed out of the strips 11 and flows back into the resin pan 17.

The forming passage 33 between the die portions 29, 31 is of substantially uniform cross section in the die illustrated in FIG. 1, and heat is applied to the resin impregnated strips 11 to accelerate curing of the resin and solidify the article while the resin impregnated filaments are under pressure.

Heating may be effected in a variety of ways; for example, by electrical resistance heaters, or by hot fluid, such as hot oil flowing in a plurality of tubes 41, shown in FIG. 1. The heating tubes 41 are arranged in the mid-portion of the die 27; other tubes 43, located adjacent the tapered entrance portion 35, carry a cooling fluid that maintains the entrance portion of the die at a temperature below the curing temperature of the resin. Thus, the cooled entrance portion of the die avoids premature hardening of the resin in the tapered entrance portion 35 and before forming of the article has taken place. Likewise, cooling tubes 45 are provided in the exit end region of both die portions 29, 31 to effect a cooling of the solidified formed article before delivering it to a pulling device (not shown) that is usually located beyond the exit end of the die 27. Moreover, the cooling effected by the fluid in tubes 45 reduces the tendency of the formed product to distort out of shape when it is suddenly exposed to ambient conditions beyond the die.

Intermediary the tapered entrance portion 35 and the mid-portion of the die 27, wherein forming of the product and heat curing of the resin takes place, there is provided an auxiliary fluid passage 47 in the upper die portion 29 that tapers from a circular opening 49 at the top surface 51 of the upper die portion 29, to a narrow rectangular opening 52 that extends transversely, generally the full width of the die passage (FIG. 2). The upper circular opening 49 is internally threaded, as at 53, to receive a threaded conduit 55 that is fluidly connected to a cylinder-piston arrangement 57 (FIG. 1) wherein there is continually maintained a quantity of thermosetting resin 59, preferably of high viscosity, derived from a suitable source of supply 61.

The procedure for initiating the pultrusion operation is similar to that described in Pat. 3,185,747. After the reinforcements 11 progress through the resin 19 in the resin pan 17, and enter the tapered entrance passage 35, some portion of the resin is expelled from the reinforcements, but just before the impregnated resin reinforcements pass through the heated mid-portion of the die 27, the upper surface of the compacted reinforcements is coated with a layer of the high viscosity resin 59 exuding from the tapered passage 52. The coating of high viscosity resin 59 applied at this point thoroughly coats the upper surface of the formed product just before the product passes through the heated mid-portion of the die structure wherein curing of the resin is accelerated. Thus, both the resin coating of the upper surface of the structure, and the resin coating the reinforcing filaments within the formed structure are heated by the hot oil flowing through the tubes 41 to a temperature whereat curing of the resin is accelerated. When the finished product emerges from the exit end of the die it has, then, a resin rich top surface that is free of surface deficiencies and inadequacies.

Those skilled in the art will recognize that the resin rich coating applied to the upper surface in the manner described herein may also be applied to the lower surface of the product or to all of the surfaces of the product by providing additional auxiliary fluid passages in the die 27 that are similar to the auxiliary passage 47. Through such other passages high viscosity resin may be introduced into the die passage to coat the bottom and side or longitudinal edge surfaces if desired.

It should be understood that whenever it is desired to form an elongate article in the die structure 27, but having a discontinuous resin-rich surface, such article may be formed in the same die 27 by intermittently applying the additional resin through the passage 47.

A feature of the invention is that the disclosed die structure is simple, and in an effective manner forms a resin-rich surface on an elongate article of manufacture continually emerging from the die structure.

A feature of the invention is that a single die structure is adaptable for shaping resin impregnated filament reinforcements into a shaped article of manufacture, and for producing a resin-rich surface on the article formed in the die.

A feature of the invention is that the method for forming resin impregnated filament reinforcements into an article of manufacture in the forming passage of a die is simple and does not require elaborate apparatus. Also, such method is quick and requires only the step of applying additional resin to at least one surface of the formed article as it passes through the die whereby the shaped and partially cured article of manufacture emerging from the die has at least one resin impregnated surface.

Although the invention has been described herein with a certain degree of particularity, it is understood that the present disclosure has been made only as an example and that various modifications and changes may be made within the scope of the invention as defined by the appended claims.

What is claimed is:
1. In apparatus for use in making elongate articles comprised of a filament reinforced resin of the thermosetting type in a forming device having an entrance end and a shaping passage therein through which the resin impregnated filament reinforcements continually move, with a portion of said shaping passage being heated to accelerate curing of the resin, the improvement for producing a resin-rich surface on said article comprising:
(a) an auxiliary passage in said die communicating with said forming passage at a location in said die intermediary the entrance of said die and the heated portion thereof wherein curing of said resin is accelerated; and
(b) means to flow liquid thermosetting resin through said auxiliary passage onto one surface of the reinforcements and form a resin-rich surface on the article formed from such reinforcements.
2. The invention of claim 1 including:
(a) means to flow liquid thermosetting resin onto a second surface of said reinforcements and form a second resin rich surface on the article formed from such reinforcements.
3. In the method for forming a resin-rich surface on a filament reinforced resinous article formed in a shaping device having an entrance, an exit, and a shaping passage therein through which resin impregnated filament reinforcements move continually with a portion of said shaping passage being heated to accelerate curing of said resin, the improvement comprising the method steps of:
(a) providing in said shaping device a fluid passage, that is located intermediate the entrance and the portion of said shaping passage that is heated, and that communicates with said shaping passage; and
(b) introducing liquid thermosetting resin into said fluid passage and forming on one surface of said resinous article a resin-rich surface.
4. The method of claim 3 including the steps of:
(a) providing in said shaping device a second fluid passage, that is located intermediate the entrance and the portion of said shaping passage that is heated, and that communicates with said shaping passage; and
(b) introducing liquid thermosetting resin into said second fluid passage and forming on another surface of said resinous article another resin-rich surface.

References Cited
UNITED STATES PATENTS

| | | | |
|---|---|---|---|
| 1,501,764 | 7/1924 | Flint | 264—174 |
| 1,681,566 | 8/1928 | Anderegg | 264—174 |
| 2,873,718 | 2/1959 | Brautigam | 264—174 |
| 3,081,213 | 3/1963 | Chinn | 18—13 |
| 3,151,354 | 10/1964 | Boggs | 18—4 |
| 3,244,784 | 4/1966 | Boggs | 264—174 |

ROBERT F. WHITE, Primary Examiner

J. R. THURLOW, Assistant Examiner

U.S. Cl. X.R.

264—174; 18—4, 13